(12) United States Patent
Lee et al.

(10) Patent No.: US 12,143,440 B2
(45) Date of Patent: Nov. 12, 2024

(54) METHOD AND DEVICE FOR DECENTRALIZED EDGE COMPUTING

(71) Applicants: PUKYONG NATIONAL UNIVERSITY INDUSTRY-UNIVERSITY COOPERATION FOUNDATION, Busan (KR); Korea University Research and Business Foundation, Seoul (KR)

(72) Inventors: Hoon Lee, Busan (KR); Sang Hyun Lee, Seoul (KR)

(73) Assignees: UNIST (ULSAN NATIONAL INSTITUTE OF SCIENCE AND TECHNOLOGY), Ulsan (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/385,126

(22) Filed: Oct. 30, 2023

(65) Prior Publication Data
US 2024/0146798 A1 May 2, 2024

(30) Foreign Application Priority Data
Nov. 1, 2022 (KR) .......................... 10-2022-0144046

(51) Int. Cl.
*H04L 67/10* (2022.01)
*G06N 3/02* (2006.01)

(52) U.S. Cl.
CPC ............... *H04L 67/10* (2013.01); *G06N 3/02* (2013.01)

(58) Field of Classification Search
CPC ................................. H04L 67/10; G06N 3/02
See application file for complete search history.

(56) References Cited

U.S. PATENT DOCUMENTS

2024/0135192 A1* 4/2024 Mayyuri ................ G06N 3/098

OTHER PUBLICATIONS

Hoon Lee, et al. Artificial Intelligence Meets Autonomy in Wireless Networks: A Distributed Learning Approach, IEEE Xplore, (20 pages), Jul. 25, 2022.

* cited by examiner

*Primary Examiner* — Nazia Naoreen
(74) *Attorney, Agent, or Firm* — Harness, Dickey & Pierce, P.L.C.

(57) ABSTRACT

The present disclosure provides a method and a device for decentralized edge computing. An edge device for implementing decentralized edge computing using a plurality of neural networks having a stacked architecture is provided, including an uncooperative unit configured to generate an initial decision using a neural network of zero-th layer that is a lowest layer of the stacked architecture, an adjacently cooperative unit configured to generate a first transmission messages and a first decision using a pair of neural networks of a first layer, and a network-wide cooperative unit configured to generate a second transmission messages and a second decision using a pair of neural networks of a second layer.

19 Claims, 8 Drawing Sheets

METHOD AND DEVICE FOR DECENTRALIZED EDGE COMPUTING

CROSS-REFERENCE TO RELATED APPLICATION

The present application claims priority to Patent Application No. 10-2022-0144046, filed on Nov. 1, 2022 in Korea, the entire contents of which are incorporated herein by reference.

TECHNICAL FIELD

The present disclosure relates to a method and a device for decentralized edge computing. More specifically, the present disclosure relates to a method and a device for decentralized optimization of the performance of an edge computing network using machine learning or deep learning.

ACKNOWLEDGEMENT

This work is supported by the Institute of Information & communications Technology Planning & Evaluation (IITP) grant funded by the Korea government (Ministry of Science and ICT) [No.2021-0-00467, Intelligent 6G Wireless Access System; No.2021-0-00260, Research on LEO Inter-Satellite Links]

BACKGROUND

The content described below merely provides background information related to the present embodiment and does not constitute the related art.

In the conventional network, a centralized network structure in which data of all devices and users are transmitted to a central processor and processed simultaneously was used adopted. Recently, the number of communication devices and users attempting to connect to the internet is increasing rapidly. Because the amount of data that the central processor which performs a conventional centralized calculation can process is limited, data processing is slowed down when data is concentrated.

In order to address this issue, an edge computing system that distributes centralized calculation to edge communication devices (e.g. Wi-Fi wireless access point, small cell satellite, etc.) has been developed. Most edge communication devices are not directed connected to the central internet and compose a core network pass through an intermediate network device such as a router, repeater, gateway, and the like. Connection state between edge communication devices depend greatly on any situation. Accordingly, in order to optimize a network by utilizing the distributed calculation capabilities of edge communication devices, a suitable network cooperative protocol is necessary. However, conventional distributed network optimization methods require completely connected state between communication devices and are not suitable for state-of-the-art edge computing networks.

Future wireless networks entail autonomous control of mobile devices in a variety of applications, such as internet of things and mobile edge computing. A distributed nature of wireless networks poses a fundamental challenge in decentralized management of separate devices. In particular, the coordination among devices possessing heterogeneous levels of cooperation policy and computation power emerges as a critical implementation issue for practical wireless networks. This challenge turns out to handle dynamic link topologies with node interconnections prone to arbitrary configurations and random changes.

SUMMARY

An embodiment of the present disclosure provides an edge device for implementing decentralized edge computing using a plurality of neural networks having a stacked architecture. The edge device includes a setting unit, an uncooperative unit, a network-wide cooperative unit and a solution decision unit. The setting unit is configured to store trained parameters of a plurality of message generating neural networks (MGNNs) and a plurality of decentralized optimizing neural networks (DONNs) and to collect an input data. The uncooperative unit is configured to generate an initial decision using a zero-th DONN of a zero-th layer that is a lowest layer of the stacked architecture; an adjacently cooperative unit configured to generate a first transmission messages using a first MGNN of a first layer that is upper layer of the zero-th layer, transmit the first transmission message to a neighbor edge device using a backhaul link, receive a first reception message generated in the neighbor edge device, and generate a first decision using a first DONN of the first layer based on the first reception message. The network-wide cooperative unit is configured to generate a second transmission message using a second MGNN of a second layer that is upper layer of the first layer, transmit the second transmission message to the neighbor edge device using the backhaul link, receive a second reception message generated in the neighbor edge device, and generate a second decision using a second DONN of the second layer based on the second reception message. The solution decision unit is configured to determine the second decision as a final solution.

Another embodiment of the present disclosure provides a method, performed by an edge device, for implementing decentralized edge computing using a plurality of neural networks having a stacked architecture. The method includes storing trained parameters of a plurality of message generating neural networks (MGNNs) and a plurality of decentralized optimizing neural networks (DONNs), collecting input data, generating an initial decision using a zero-th DONN of a zero-th layer that is a lowest layer of the stacked architecture, generating a first transmission message using a first MGNN of a first layer that is upper layer of the zero-th layer, transmitting the first transmission message to a neighbor edge device and receiving a first reception message from the neighbor edge device using a backhaul link, generating a first decision using a first DONN of the first layer based on the first reception message, generating a second transmission message using a second MGNN of a second layer that is upper layer of the first layer, transmitting the second transmission message to the neighbor edge device receiving a second reception message from the neighbor edge device using the backhaul link, generating a second decision using a second DONN of the second layer based on the second reception message, and deciding a second decision as a final solution.

DETAILED DESCRIPTION

The present disclosure provides a structural learning solution called Platform for Learning Autonomy in Distributed Optimization (PLAyDO), with an objective of modeling dynamic interactions among wireless devices through a mesh of a deep neural networks (NNs).

An aspects of the present disclosure may provide a method and edge devices for distributing the amount of centralized data by deriving a solution using a plurality of edge devices.

An aspects of the present disclosure may provide a method and edge devices for sharing solutions derived in each of the edge devices with all the edge devices by performing communication indirectly with a distant edge device that is not directly connected based on messages between neighbor edge devices on a wireless network.

The features of the present disclosure are not limited to the feature above, and other feature not mentioned herein will be clearly understood by those having ordinary skill in the art from the following description.

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude other components unless specifically stated to the contrary. The terms such as 'unit', 'module', and the like refer to one or more units for processing at least one function or operation, which may be implemented by hardware, software, or a combination thereof. When the unit, module, element, or the like of the present disclosure is described as having a purpose or performing an operation, function, or the like, the unit, module, or element should be considered herein as being "configured to" meet that purpose or to perform that operation or function.

Self-organization has become a distinctive feature for a collective action of devices installed at edges in wireless networks. Here, self-organization refers to operating an organization in a revolutionary method without pressure exerted from the outside. That is, this refers to a plurality of components reconfiguring the system through interactions in one system.

Such an edge network essentially requires autonomous and decentralized device controls so that device interactions are adaptively harmonized according to time-varying network environments. As a result, new challenges for distributed optimization in wireless network management have emerged, namely, decentralized computation rules for network organizations and device coordination scheduling.

Over the last decade, there have been a variety of attempts on the network management decentralization, mostly upon optimization-based mathematical foundations. Furthermore, the pinpoint control of decentralized decision and coordination is vital at every scene of network management, e.g., optimization targets, communication/computation features of devices, and local topology.

Deep learning (DL) technologies have emerged as promising alternatives to classical optimization approaches for distributed network management. In particular, a learning to cooperate mechanism has opened new opportunities for cooperative network management triggered by DL-aided controls. This framework characterizes computation and coordination policies that devices process with a series of neural networks (NNs). Distinct NNs are introduced at individual devices to embody wireless device properties about managing decentralism and autonomy in the network, under separate dataset handling and pairwise interconnections. A collection of such NN pairs is designed to learn cooperative interactions. However, a rigid structural property of existing NN techniques requires a complete set of all pairwise device interactions even if only a subset of device pairs is interconnected. This severely undermines DL-oriented solutions in wireless networks with dynamic topology. It is of utmost importance to answer the question on how to construct an efficient NN architecture that allows devices with heterogeneous computational resource and dynamic backhaul topologies.

To overcome these limitations, the present disclosure presents a novel DL-aided framework termed PLAyDO. This framework addresses a class of decentralized decision tasks in self-organizing management of wireless networks with dynamic topology. To this goal, a cascade of NNs is incorporated at individual devices for successful identification of their optimal states through multi-hop propagation/sharing of locally available information. Here, the multi-hop method refers to a method in which a message is transmitted from a transmission node to a final destination node via one or more intermediate nodes. Therefore, this framework can organize an effective network-wide scheduling policy under dynamic network topologies.

Decentralized Network Management

Massive connectivity has become a principal feature for future wireless networks. However, its ever-growing demands will soon be no longer met with the current centralized technology in charge of the supervision of numerous devices. This solicits a radical low-cost solution for intelligent self-organization and autonomous administration of devices. A fundamental drawback of decentralized network management in dynamic topologies is that local decisions based on locally available measurement are usually non-optimal. As such, a viable approach is to incorporate a self-optimizing strategy of the device cooperation including transmission, reception, routing, relaying, and scheduling. In present disclosure, a cooperative inference task is formalized under distributive communication environment subject to the limitation of existing solutions.

A. Cooperative Formalism

Edge devices make their own decisions about networking policies, e.g., node associations, resource allocations, and beam radiation patterns, by means of unsupervised coordination with adjacent devices.

Local data vectors include observations made from wireless environment, e.g., channel state information (CSI) and received signal strength. These are collected at individual devices but may not be available to other devices. On the other hand, the network state is represented by a collection of local decisions and data vectors. Furthermore, devices aim cooperatively to optimize the performance by monitoring local data only. Reciprocal interference among devices and limitations on wireless resources make the network highly coupled, thereby resulting in decentralized decisions of individual devices significantly affecting each other. Consequently, the network utility depends dominantly on local data and decisions. This imposes the availability of the global network state on all network devices by means of the perfect local dataset collection.

However, the distributed nature of wireless networks renders such a goal difficult to achieve under only limited coordination. It relies on wired or wireless network infrastructure that normally undergoes random perturbation and noise. As a result, a joint policy of decentralized computation and distributed interaction that manages arbitrary connection topology is necessary.

B. State-of-the-art DL-based Approaches

There have recently been a number of DL-based wireless resource management strategies for otherwise critical challenges in traditional optimization algorithms, such as non-convexity, dependence on analytical models, and model-based computations. The introduction of NNs to construct an optimizer proves powerful to identify unknown maximization flows with non-convex utility under arbitrary networking constraints. The realization of such NNs, however, invokes a centralized calculation via the global knowledge of distributed data vectors.

To establish a decentralized computation policy, an individual device incorporates an isolated NN operating with local data only. A global dataset is collected to train a single NN for universal use among all devices. Locally unavailable knowledge about states of other devices is made do with their long-term statistics. Such a provisional solution simply collapses under instantaneous changes in the network, eventually degrading the network performance. Meanwhile, a set of NNs dedicated to take care of individual decisions are brought in for improved DL-based device models. Individual NN units are deployed at devices to process real-time computations for the decentralized decision inference. Yet, for the lack of interactions among device NNs, this uncooperative mechanism isolates distributively collected data within local devices, preventing the global propagation of the network information. Thus, device NNs are designed to obtain some side information from neighbors, such as CSI estimates of unintended users, which may become available through passive sensing. Although instantaneous information produces some improvement over uncooperative counterparts, the optimality is not guaranteed since such an NN architecture seeks a handcrafted design for the passive detection. This naturally invokes a self-organizing learning framework that identifies device communicating protocols autonomously.

A multi-agent learning framework is also attempted as a cooperative mechanism from the reinforcement learning (RL) context. A device designated as an agent incorporates NN-based computational intelligence that determines an individual policy for valid actions. Agents share local data with neighbors through predefined interfaces. A group of NNs deployed at agents is responsible for distributed computations with collective information obtained from agent interactions. The reward of an agent is concocted to capture stochastic relationships among states, actions, and rewards of others so that individual agents participate in the cooperative optimization of a common network utility. In particular, a proper reward shaping negotiates conflicting objectives between egoistic solutions and altruistic interactions. A distributed setup preferably requests individual rewards and independent decision strategies unaffected by neighbors' actions. However, the realization of such features becomes challenging in highly coupled multi-agent environments since this task involves manual adjustment of tractable rewards and plausible interaction policies. The optimization of agent cooperation protocol involves a computationally-demanding problem-specific search, which prohibits the generality in solution-finding rules. It is not necessarily efficient in managing self-organizing networks with explicit utilities and strict local constraints.

This motivates us to develop a learning to cooperate paradigm. Unlike multi-agent RL techniques relying on handcrafted interaction designs, this method seeks autonomous controls of device cooperation policies. The ultimate goal is to let devices know how to take active interactions via the exchange of relevant information over network topologies. To this end, devices generate messages, which are indeed NN-computed embedding vectors of local information dedicated to individual neighbors with device-to-device links. This enables to capture instantaneous changes of the surrounding neighborhood. A state decision is made independently at a device from incoming messages along with locally obtained information. This boils down to a combined computation of two inference subtasks: message-generating inference and distributed decision inference. These subtasks are characterized by a pair of dedicated NN units that determine learning parameters collaboratively for optimizing the network utility.

The need for a fully connected network topology is a fundamental limitation in the extension of existing solutions to such twofold targets. All devices are necessarily accessible via direct links which simplify the acquisition of the neighborhood data into a naive inquiry to each neighbor. Thus, the NN-based inference becomes restricted within the neighborhood-based coordination. Any devices leaving the network may incur the failure of the information propagation, resulting in the network performance degradation. To achieve the autonomy under arbitrary backhaul connections, network-wide interaction strategies are necessary in the design of the NN-based inference.

Figure 1A:
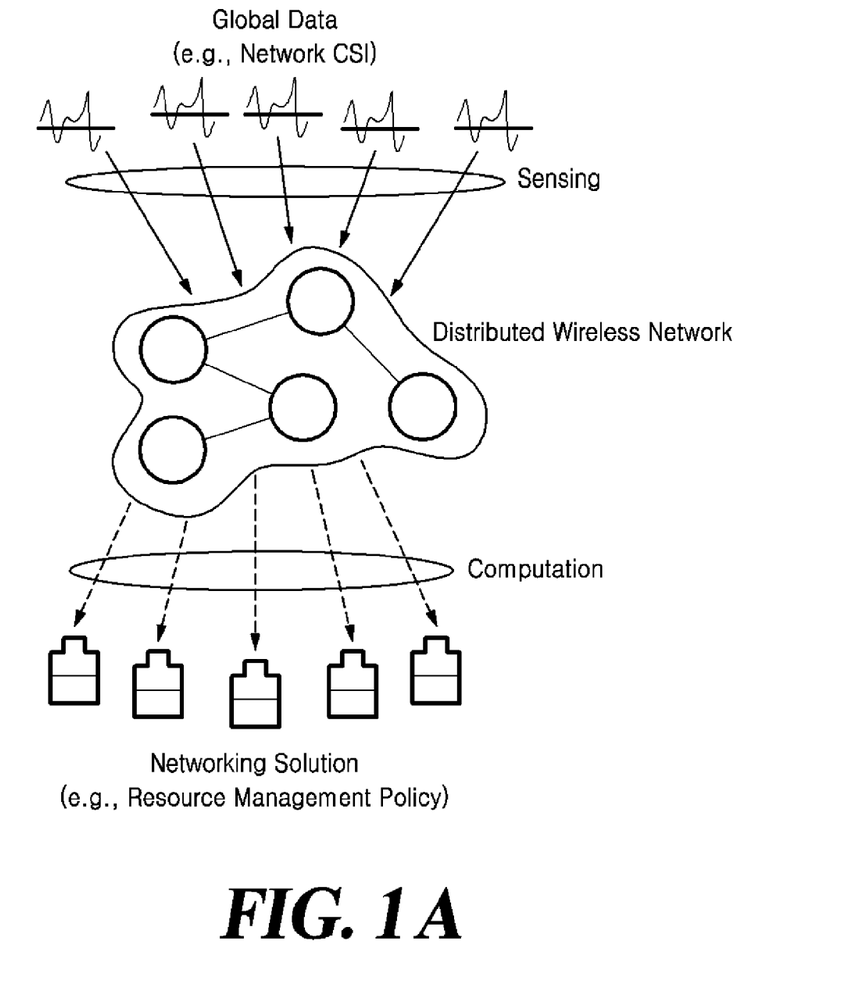
FIG. 1A illustrates a decentralized wireless network composed of a plurality of edge devices according to an embodiment of the present disclosure.
Figure 1B:
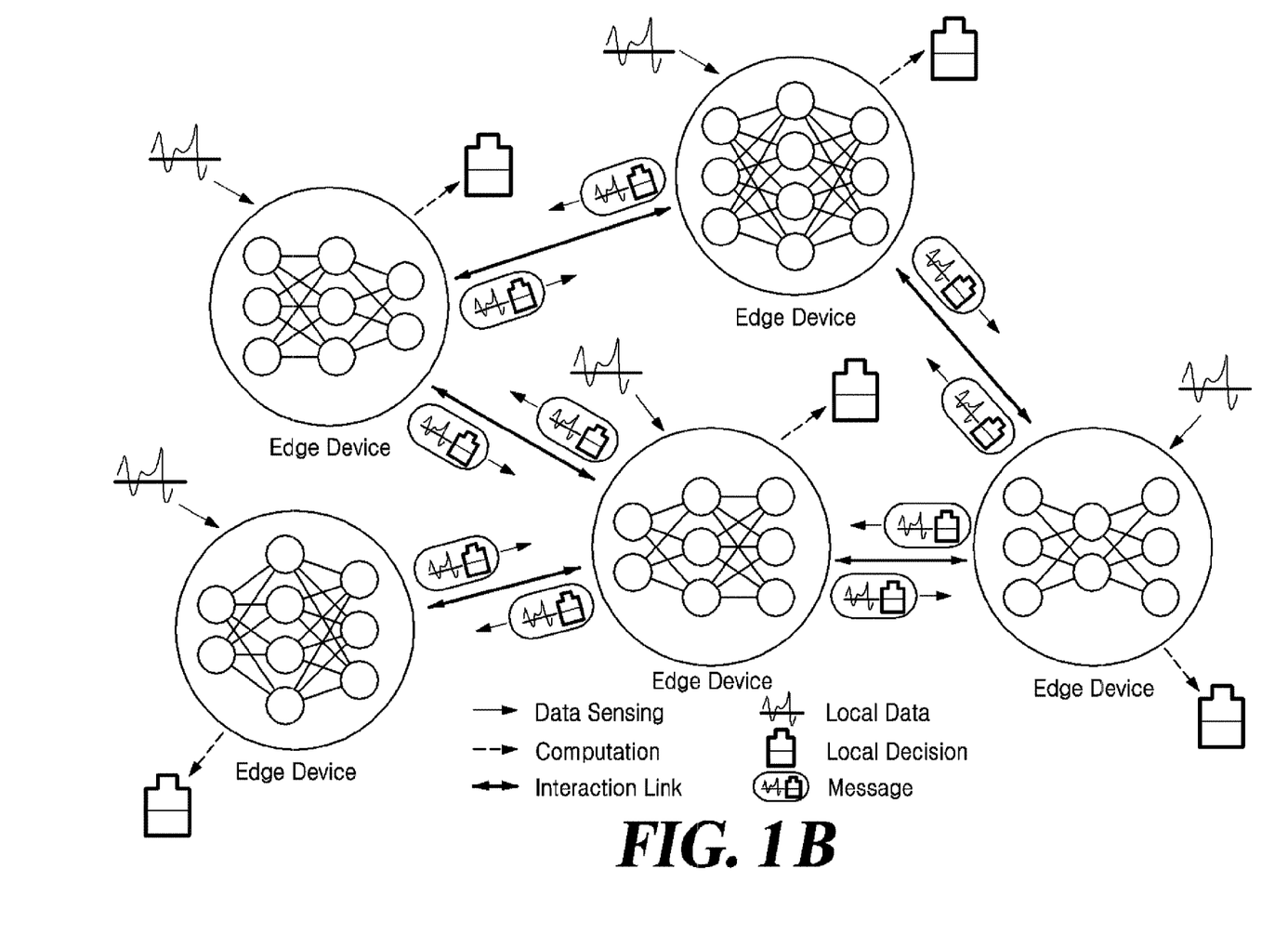
FIG. 1B illustrates a decentralized wireless network composed of a plurality of edge devices according to an embodiment of the present disclosure.

FIGS. 1A and 1B illustrates a decentralized wireless network comprising a plurality of edge devices according to an embodiment of the present disclosure.

Referring to FIG. 1A, the decentralized wireless network includes a plurality of edge devices. The decentralized wireless network may derive a network solution using the plurality of edge devices based on global data.

FIG. 1B illustrates a diagram of exchanging data and decisions among the plurality of edge devices within the decentralized wireless network.

Referring to FIG. 1B, each of the plurality of edge devices generate a message, local data and local decision, and shares the same directly with neighbors using directly connected neighbors. Here, local decision refers to a solution generated in a particular edge device. In a decentralized wireless network, the solution even edge devices that are not directly connected may share using directly connected edge devices.

Figure 2:
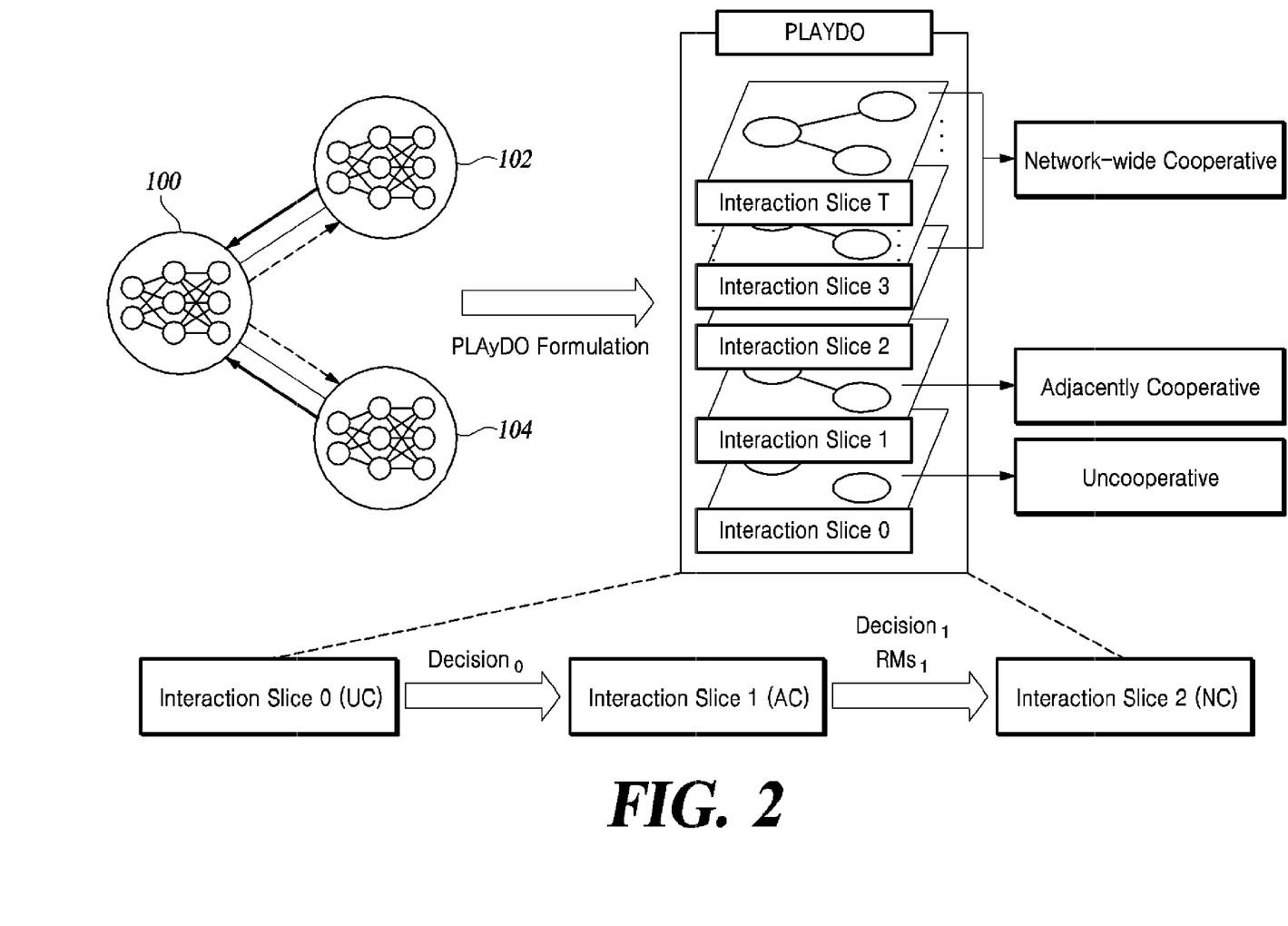
FIG. 2 illustrates a Platform for Learning Autonomy in Distributed Optimization framework for network self-organization according to an embodiment of the present disclosure.

FIG. 2 illustrates a Platform for Learning Autonomy in Distributed Optimization framework for network self-organization according to an embodiment of the present disclosure.

Referring to FIG. 2, a first edge device 100 is directly connected with a second edge device 102 and a third edge device 104 respectively, but the second edge device 102 and the third edge device 104 are not mutually connected. In this case, the first edge device 100 may directly share messages and local data with the second edge device 102 and the third edge device 104. The second edge device 102 and the third edge device 104 may indirectly share their messages and local data with each other through the first edge device 100.

For such data exchange, the present disclosure presents a new platform termed PLAyDO.

PLAyDO Architecture

The present disclosure presents the PLAyDO framework that elicits an efficient learning approach to decentralized management with limited device interactions. The state inference at individual devices is substituted with an NN unit dedicated to autonomous joint computation rules for messages and decisions via a data-driven policy. However, it remains unaddressed how independent inferences are integrated into a cooperative computation flow for the utility optimization. To this end, a structural learning framework is established so that distinct NNs participate in the consolidation of a sole forward-pass computation strategy. Subsequently, its novel technique is developed for the data-driven parameterization for device NNs.

Partially connected backhaul topology undermines close device interactions, incurring information asymmetry and inefficiency in local network areas. To this shortcoming, PLAyDO formalizes a network-wide coordination. Multi-hop interactions are realized in a way of propagating message exchanges between distant devices without making direct device connections. An iterative coordination policy is taken into account so that locally available statistics and decisions are shared over the network through a series of device interactions.

Such a feature is realized in a stacked architecture of several NN layers. Each layer of cooperative NN groups, referred to as an interaction slice, is associated with an extended interaction capability of devices as shown in FIG. 2. An interaction slice partitions the entire trajectory of multi-hop cooperation into several segments. Each slice partitions the entire trajectory of multi-hop cooperation into several segments. Each slice evaluates the device operation at the corresponding hop in a series of the message propagation. The interaction slice associated with each level of the multi-hop processing takes the input of the computation results from the interaction slice at the preceding level. It produces a set of progressively updated messages and decisions.

For the detailed description of interaction levels, device cooperation modes are categorized into UnCooperative (UC) phases, Adjacently Cooperative (AC) phases, and Network-wide Cooperative (NC) phases.

Figure 3A:
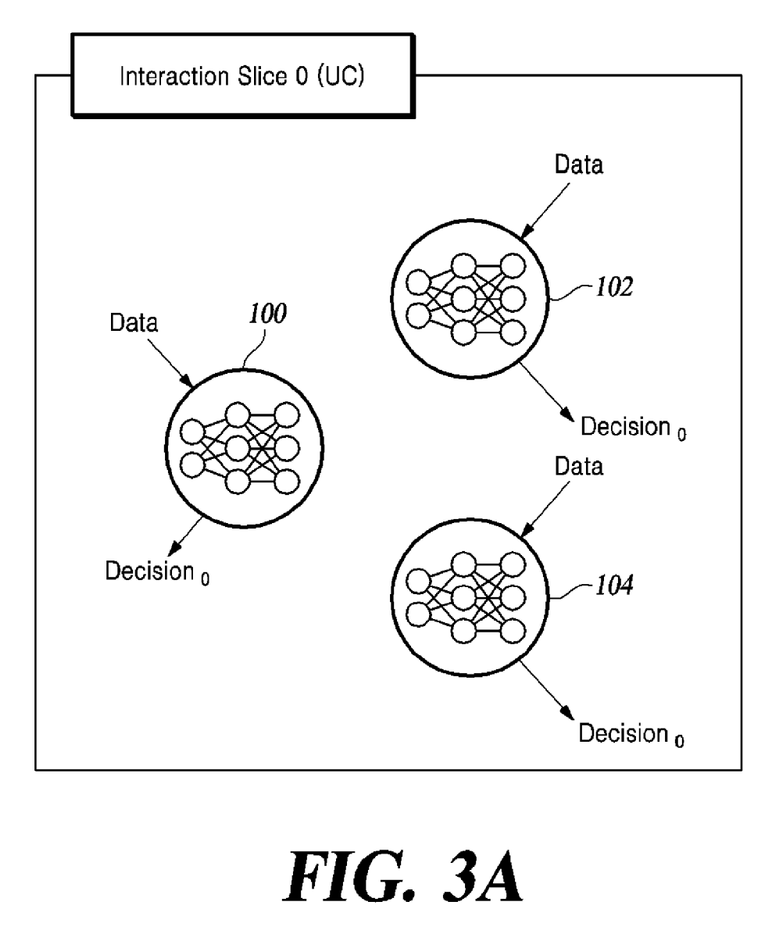
FIG. 3A is a diagram to illustrate an Uncooperative slice, an Adjacently Cooperative slice, and a Network-wide Cooperative slice according to an embodiment of the present disclosure.
Figure 3B:
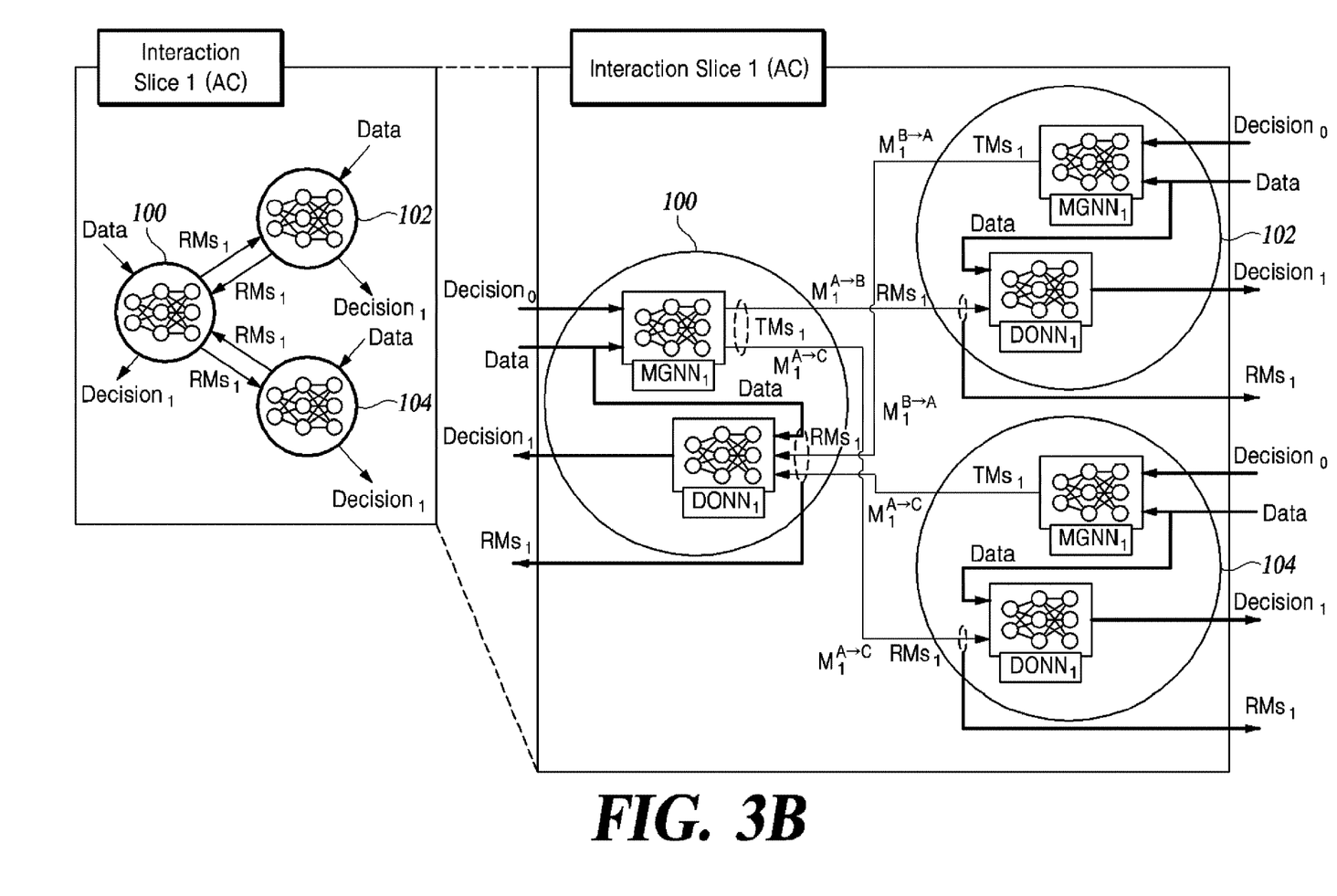
FIG. 3B is a diagram to illustrate an Uncooperative slice, an Adjacently Cooperative slice, and a Network-wide Cooperative slice according to an embodiment of the present disclosure.
Figure 3C:
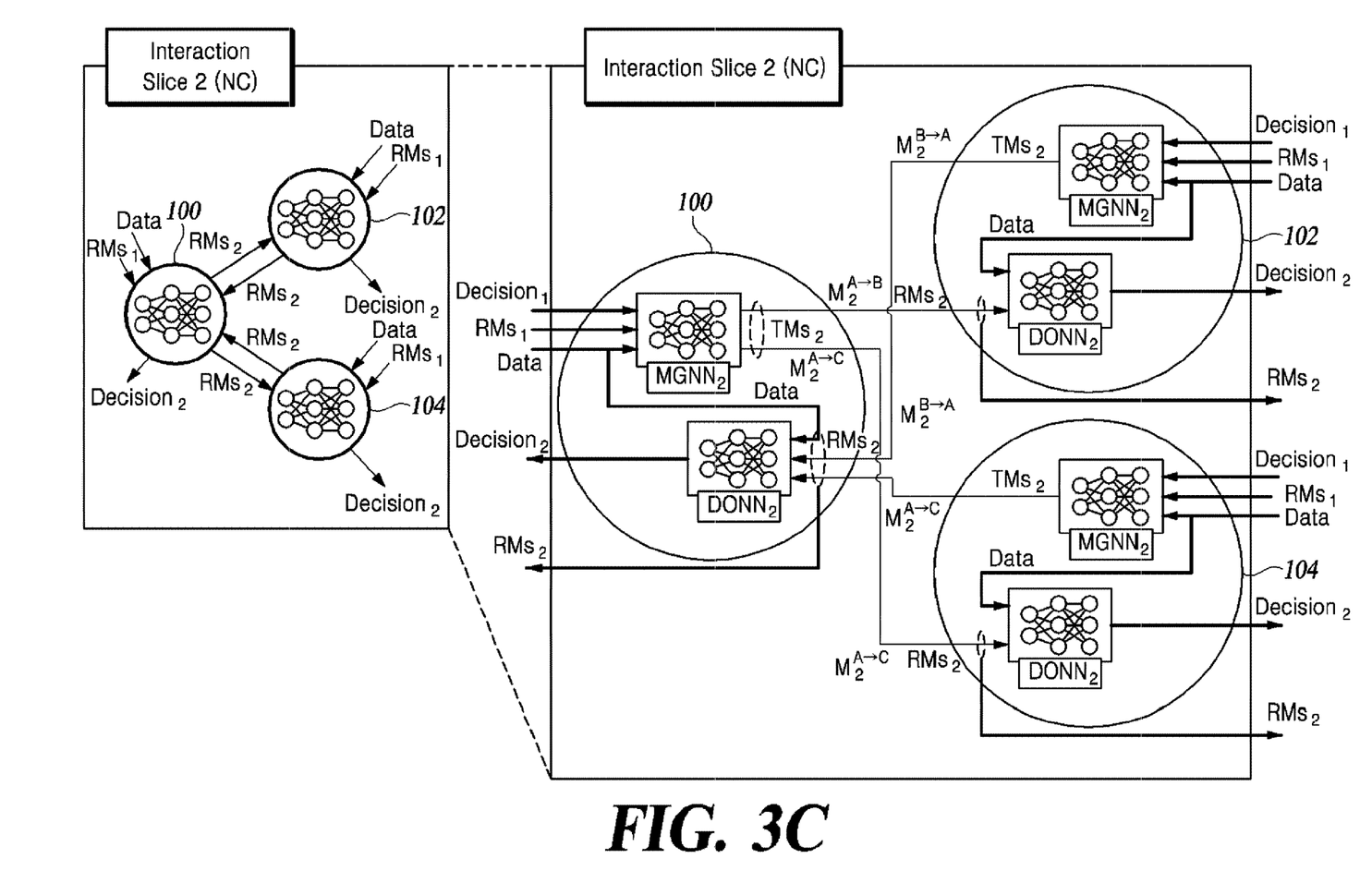
FIG. 3C is a diagram to illustrate an Uncooperative slice, an Adjacently Cooperative slice, and a Network-wide Cooperative slice according to an embodiment of the present disclosure.

FIGS. 3A to 3C are diagrams to illustrate an UC slice, an AC slice, and a NC slice according to an embodiment of the present disclosure.

FIG. 3A is diagram to illustrate an UC slice in PLAyDO.

The UC phase refers to connection-free operations of interaction slice 0 with only isolated edge devices 100, 102 and 104. In this initial mode of the PLAyDO, individual edge devices 100, 102 and 104 estimate efficient decisions based only on their local data. A decentralized optimizing neural network (DONN), denoted by $DONN_0$, maps local data to initial decision $Decision_0$. The subscript stands for the interaction slice index. Individual edge devices 100, 102 and 104 use their own DONNs to handle heterogeneous statistics and distinct features of local data.

FIG. 3B is diagram to illustrate an AC slice in PLAyDO.

The cooperation comes into play from the first interaction level defined by slice 1. The edge devices 100, 102 and 104 update their new decisions with incoming messages about initial decisis of others. Since the message exchange is only available among neighbors, the cooperation class at interaction slice 1 is referred to as Adjacently Cooperative (AC). A message-generating neural network (MGNN), denoted by $MGNN_1$ in FIG. 3B, obtains an embedding vector that encapsulates statistics from the previous slice, containing local data and initial decision $Decision_0$. NN units generate and exchange messages autonomously instead of hand-crafted signal patterns, regardless of the edge device interconnection status. The corresponding output is a set of transmission messages (TMs), denoted by $TMs_1$, transferred to the neighborhood. For example, the first edge device 100 generates $TMs_1$ including two messages $M_1^{A \rightarrow B}$ and $M_1^{A \rightarrow C}$, respectively, destined for the second edge device 102 and the third edge device 104. Likewise, it receives messages back from two neighbors, i.e., $M_1^{B \rightarrow A}$ and $M_1^{C \rightarrow A}$. The edge devices 100, 102, and 104 make local decisions with incoming messages as the side information. Such local decisions can collectively fulfil the optimization as if an equivalent single NN forward-pass processing calculates the solution. As a result, a new decision, denoted by $Decision_1$, is obtained by $DONN_1$ using the collection of reception messages (RMs), denoted by $RMs_1$. Thus, a number of existing distributed DL-based optimization approaches can be viewed as special instances of this class.

FIG. 3C is diagram to illustrate an NC slice in PLAyDO.

The AC-level interaction poses an essential challenge of the cooperation enhancement under practical distributed networks with a number of device pairs missing direct links. The PLAyDO framework resolves such difficulties through network-wide cooperation modes. Through additional slices connected in series to the AC phase slice, devices can be informed of instantaneous local data of nearby devices as well as of distant devices that have no direct links. For example, local $MGNN_2$ of each edge device 100, 102 and 104 calculates $TMs_2$ with $RMs_1$ and $Decision_1$ provided from the AC slice. This proceeds multi-hop message propagations that enable network-wide sharing of adjacent statistics.

Upon message reception by the AC slice, $MGNN_2$ aggregates $RMs_1$ and local statistics to obtain $TMs_2$ including $M_2^{A \rightarrow B}$ and $M_2^{A \rightarrow C}$ sent back to the neighborhood. These TMs contain the information about $RMs_1$ including $M_1^{B \to A}$ and $M_1^{C \to A}$. The decisions of neighbors at the preceding slice are encoded in RMs. Thus, local information about the second edge device 102 reaches the third edge device 104 and vice versa, despite missing direct interactions. All edge devices 100, 102 and 104 conduct the same operations. Subsequently, $DONN_2$ located at an individual edge device 100, 102 and 104 obtains $Decision_2$.

To achieve an elaborated autonomy under a generic network topology, each layer of multiple NC slices collaboratively refines the message generation and the decision. Such a T-hop structure is realized in a cascade of slices 2, 3, ..., T. The NN pair of $DONN_2$ and $MGNN_2$ is reused by consecutive NC slices since identical computations are repeated. This layered framework provides gradual cooperation enhancement for decentralized optimization results.

Training Strategy

A cascade of interaction slices processes the forward-pass computation, while individual slices evaluate their own network utility values. The training objective function is an aggregated utility of T+1 interaction slices. It is optimized with individual inference results of device NNs that are synchronized by an iterative nature of the decentralized optimization. The training computation does not use any regularization such as a handcrafted design rule for message generation. As a result, MGNNs located at respective slices are trained for self-organizing cooperation to optimize the overall network utility. The device knowledge, i.e., messages generated by MGNNs, becomes informative about the network topology as the interaction slices grow. This induces gradual enhancement of the DONN cooperative decisions. The convergence is accomplished when a fixed assignment of messages and decisions is found at a certain level of the interaction slice. Offline training calculation can be assisted by intensive computation of the remote edge cloud resource. Gradient-based optimization algorithms proceed the back-propagation updates beginning from the last slice to the UC slice. The training computation indeed solves the distributed optimization in a fully unsupervised manner. No labeled dataset associated with the solution is necessary, while local data vectors are used as training datasets.

Figure 4:
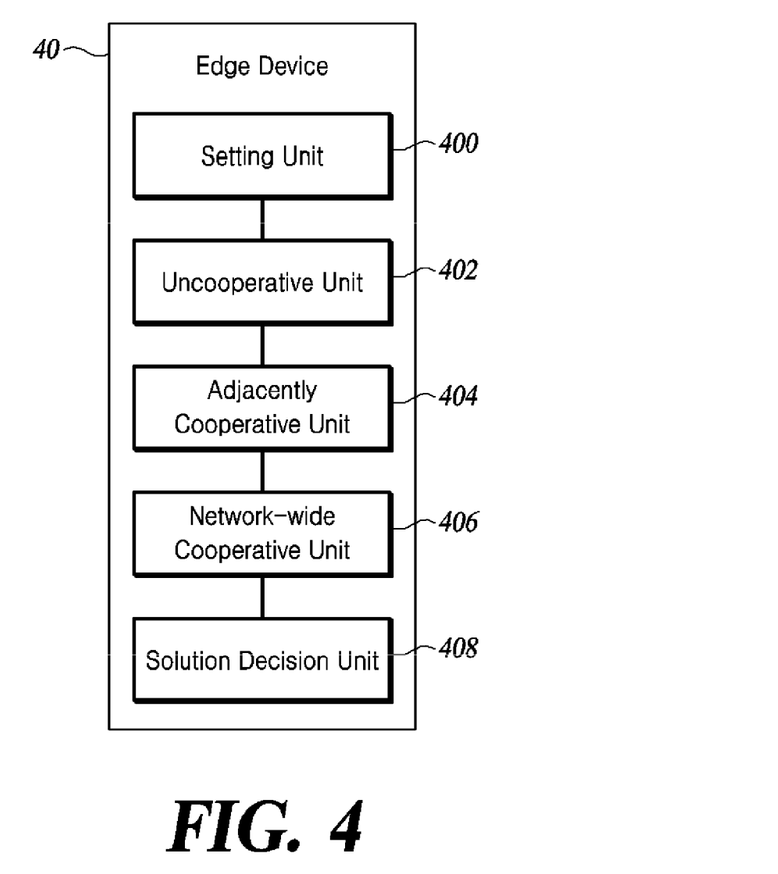
FIG. 4 is a block configuration diagram of an edge device for decentralized edge computing according to an embodiment of the present disclosure.

FIG. 4 is a block configuration diagram of an edge device for decentralized edge computing according to an embodiment of the present disclosure.

Referring to FIG. 4, an edge device 40 for decentralized edge computing includes all or some of a setting unit 400, an uncooperative unit (UC unit) 402, an adjacently cooperative unit (AC unit) 404, a network-wide cooperative unit (NC unit) 406, and a solution decision unit 408.

The edge device 40 may implement decentralized edge computing using a plurality of neural networks having a stacked architecture. The stacked architecture may include a plurality of layers. The layers may correspond to the interaction slices shown in FIG. 2, or FIGS. 3A to 3C. An MGNN and/or an DONN corresponding to each layer may be included in each layer.

The setting unit 400 stores trained parameters of a plurality MGNNs and a plurality DONNs. The setting unit 400 collects input data $Data_i$. Herein, the MGNNs, the DONNs, and the input data for a particular edge device 40 may be referred to as local MGNNs, local DONNs, and a local data. Additionally, the setting unit 400 may decide the maximum multi-hop cooperation number T, wherein T is a non-negative integer, and initialize a current cooperation number t, wherein t is non-negative integer, to 0, and the solution decision unit 408 may determine whether the t value is T every time each of the AC and/or NC phase is performed. When t is determined to not be T, the setting unit 400 may increase t to t+1. The setting unit 400 may identify a set of neighbor edge device(s) N(i) for each edge device 40. The purpose of this is to exchange messages among neighbors.

The UC unit 402 may generate an initial decision $Decision_0$ corresponding to an initial solution using $DONN_0$. Herein, the $DONN_0$ may be a DONN of a $0^{th}$ layer that is a lowest layer of the stacked architecture. The UC unit 402 may obtain the initial decision by inputting the input data into the $DONN_0$. In other words, the $DONN_0$ may generate the initial decision based on the input data collected by the edge device 40. The UC unit 402 generates the initial decision when the current cooperation number t is equal to 0. Thereafter, if the pre-determined maximum multi-hop cooperation number T is not 0, the setting unit 400 is may increase the current cooperation number t by 1, that is, the current cooperation number t becomes 1. The initial decision generated in the $i^{th}$ edge device may be represented as Equation 1.

$$Decision_0 = DONN_0(Data_i), \forall i \quad (1)$$

The AC unit 404 may generate a first message $M_1$ using $MGNN_1$ and transmits the first message to neighbor edge device(s) using a backhaul link. Additionally, the AC unit 404 may receive the first message generated in neighbor edge device and generate a first decision $Decision_1$ using $DONN_1$ based on the received first message. Herein, the $MGNN_1$ and the $DONN_1$ may be a MGNN and a DONN of a first layer that is upper layer of the $0^{th}$ layer, respectively. The $DONN_1$ may be different from the $DONN_0$. The AC unit 404 may input the input data and the initial decision into the $MGNN_1$. Accordingly, the $MGNN_1$ may generate the first message that encapsulates a lower layers' statistics, that is, the $0^{th}$ layer's statistics, including the input data and the initial decision. The AC unit 404 may input the input data and the first message generated in neighbor edge device into the $DONN_1$. Accordingly, the $DONN_1$ may generate the first decision based on the input data collected by each of the edge device 40 and the neighbor edge device. The AC unit 400 generates the first message and the first decision when the current cooperation number t is equal to 1. The first message and the first decision generated in the $i^{th}$ edge device may be calculated by Equation 2 and Equation 3, respectively.

$$TMs_1 = \{M_1^{i \to j} : \forall j \in N(i)\} = MGNN_1(Data_i, Decision_0),$$
$$\forall i\ RMs_1 = \{M_1^{j \to i} : \forall j \in N(i)\} \quad (2)$$

$$Decision_1 = DONN_1(Data_i, RMs_1), \forall i \quad (3)$$

The NC unit 406 may generate a second message $M_2$ using $MGNN_2$ and transmits the second message to neighbor edge device(s) using a backhaul link. Additionally, the NC unit 406 may receive the second message generated in neighbor edge device(s) and generates a second decision $Decision_2$ using $DONN_2$ based on the received second message. Herein, the $MGNN_2$ and the $DONN_2$ may be a MGNN and a DONN of a second layer that is upper layer of the first layer, respectively. The $MGNN_2$ and the $DONN_2$ may be different from the $MGNN_1$ and the $DONN_1$, respectively. The NC unit 406 sequentially generates the second message to a $T^{th}$ message using $MGNN_2$ to $MGNN_T$ and sequentially generates the second decision to a $T^{th}$ decision using $DONN_2$ to $DONN_T$, while the current cooperation number t increases from 2 to T. The $MGNN_2$ and the $DONN_2$ may be reused as a $MGNN_t$ and a $DONN_t$, respectively, when the current cooperation number t is greater than 2. The NC unit 406 may input the input data, a $(t-1)^{th}$ message received from the neighbor edge device, and a $(t-1)^{th}$ decision into the $MGNN_t$. The $MGNN_t$ may generate a $t^{th}$ message that encapsulates a lower layers' statistics, that is the $(t-1)^{th}$ layer's statistics, including the $(t-1)^{th}$ message received from the neighbor edge device and the $(t-1)^{th}$ decision. The NC unit 406 may input the input data and the $t^{th}$ message generated in neighbor edge device into the $DONN_t$. Accordingly, the $DONN_t$ may generate the $t^{th}$ decision based on the input data collected by each of the edge device 40, the neighbor edge device, and a distant edge device that have no direct link with the edge device. After each decision generation of the NC unit 406, if the current cooperation number is less than the pre-determined maximum multi-hop cooperation number T, the setting unit 400 may increase the current cooperation number t by 1.

The $t^{th}$ message and $t^{th}$ decision, wherein t is an integer greater than or equal to 2, generated in the $i^{th}$ edge device may be calculated using Equation 4 and Equation 5.

$$TMs_t = \{M_t^{i \to j} : \forall j \in N(i)\} = MGNN_t(Data_i, Decision_{t-1}, RMs_{t-1}), \forall i \ RMs_t = \{M_t^{j \to i} : \forall j \in N(i)\} \quad (4)$$

$$Decision_t = DONN_t(Data_i, RMs_t), \forall i \quad (5)$$

The solution decision unit 408 may decide the decision generated in the NC unit 406 as the final solution. To this end, the solution decision unit 408 may determine whether the current cooperation number t is equal to the pre-determined maximum multi-hop cooperation number T. In response to determining that the t value is equal to T, the solution decision unit 408 may decide the $T^{th}$ decision as the final solution.

Figure 5:
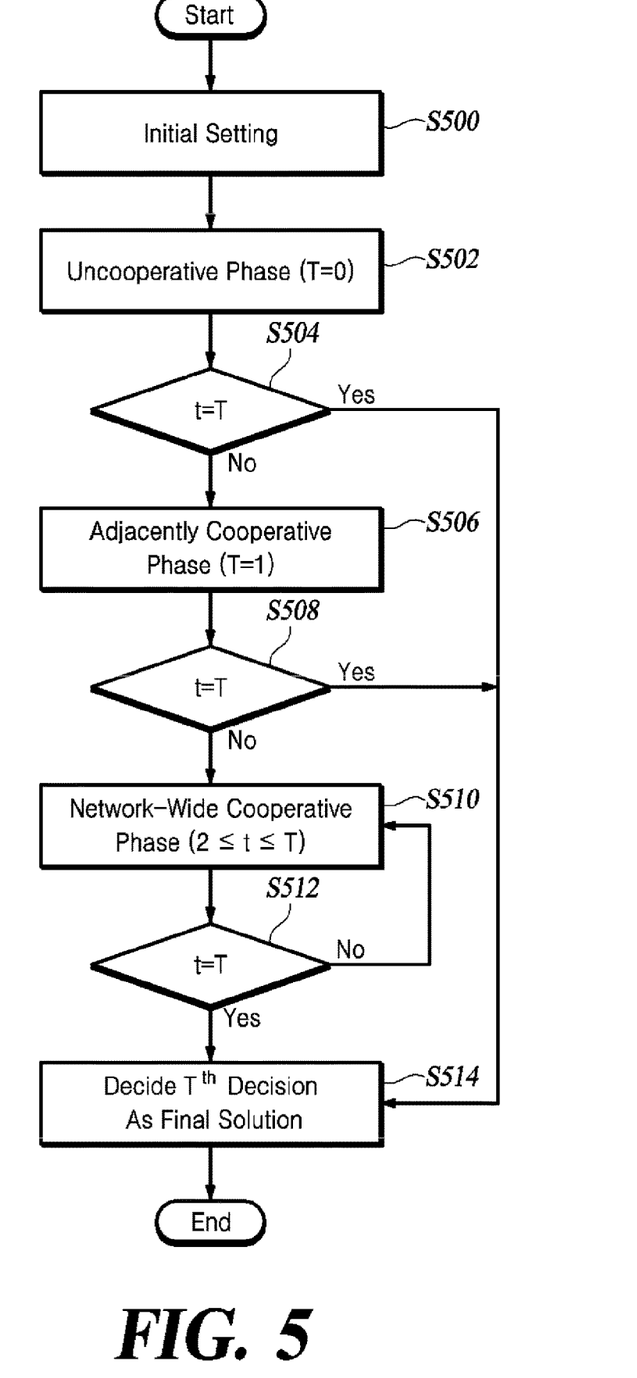
FIG. 5 is a flowchart of a method for decentralized edge computing according to an embodiment of the present disclosure.

FIG. 5 is a flowchart of a method for decentralized edge computing according to an embodiment of the present disclosure.

Referring to FIG. 5, In step S500, a plurality of edge devices may perform an initial setting phase. In the initial setting phase, each edge device may store trained parameters of local MGNNs and local DONNs and may collect input data. The initial setting may include deciding a maximum multi-hop cooperation number T and initializing a current cooperation number t to 0.

In step S502, each edge device may perform an UC phase. In the UC phase, an initial solution $Decision_0$ is generated using $DONN_0$ for each of the plurality of edge devices. The UC process is performed when the current cooperation number t is equal to 0.

In Step 504, each edge device may compare the current cooperation number t and the maximum multi-hop cooperation number T When it determined in step S504 that t is equal T, that is, when T is equal to 0, the flow proceeds to step S514. In step S514, the initial solution for each edge device is determined as a final solution for each edge device.

When it determined in step S504 that t is not equal to T, that is, when T is not equal to 0, the current cooperation number t is increased by 1 and the flow proceeds to step S506. In step S506, each edge device may perform an AC phase in cooperation with other edge device(s). In the AC phase, each edge device may generate a first transmission message using MGNN1 of one's own and may transmit the first transmission message to neighbors using a backhaul link. Further, in the AC phase, each edge device may receive a first reception message generated in neighbors and may generate a first decision Decisions using DONN1 based on the first reception message. The AC phase is performed when the current cooperation number t is equal to 1.

In Step 508, each edge device may compare the current cooperation number t and the maximum multi-hop cooperation number T.

When it determined in step S508 that t is equal to T, that is, when T is equal to 1, the flow proceeds to step S514. In step S514, the first decision for each edge device is determined as the final solution for each edge device.

When it determined in step S508 that t is not equal to T, that is, when T is not equal to 1, the current cooperation number t is increased by 1 and the flow proceeds to step S510. In step S510, each edge device may perform an NC phase in cooperation with other edge device(s). In the NC phase each edge device may generate a $t^{th}$ transmission message using $MGNN_t$ of one's own and may transmit the second transmission message to neighbors using a backhaul link. In the NC phase, each edge device may receive a second reception message generated in neighbors and generate a $t^{th}$ decision $Decision_t$ using $DONN_t$ based on the second reception message The NC phase is performed when the current cooperation number t is between 2 and T.

In Step 512, each edge device may compare the current cooperation number t and the maximum multi-hop cooperation number T.

When it determined in step S512 that t is not equal to T, the flow returns to step S510 and the NC phase is performed repeatedly until t becomes T. In other words, when T is greater than or equal to 3, the NC phase may be repeated two or more times until t is equal to T. For example, when T was set to 4 in S500, each edge device performs the NC phase to generate the second transmission message and the second decision when t is equal to 2. Furthermore, each edge device performs the NC phase to generate a third transmission message and a third decision when t is 3. Lastly, each edge device performs the NC phase to generate a fourth transmission message and a fourth decision when t is equal to 4.

When it determined in step S512 that t is equal to T, the flow proceeds to step S514. In step S514, the $T^{th}$ decision for each edge device is determined as the final solution for each edge device.

According to an embodiment, the problem of delayed data processing which occurs in centralized calculation can be addressed by sharing solutions derived in each of the edge devices with other edge devices.

According to an embodiment of the present disclosure, the mutually unconnected edge devices can share their solutions indirectly through continuous solution sharing between the mutually connected edge devices.

The feature obtainable by the present disclosure are not limited to the feature described above, and other features not mentioned herein will be clearly understood by those having ordinary skill in the art from the above description.

Each component of the device or method according to the present disclosure may be implemented in hardware or software, or a combination of hardware and software. Further, a function of each component may be implemented in software and a microprocessor may be implemented to execute the function of the software corresponding to each component.

Various implementation examples of the systems and techniques described herein may be realized by a digital electronic circuit, an integrated circuit, an FPGA (field programmable gate array), an ASIC (application specific integrated circuit), computer hardware, firmware, software, and/or a combination thereof. These various implementation examples may be implemented by one or more computer programs executable on a programmable system. The programmable system includes at least one programmable processor (which may be a special purpose processor or may be a general purpose processor) connected to receive data and instructions from a storage system, at least one input device, and at least one output device and transfer data and instructions to these. The computer programs (also known as programs, software, software applications, or code) include instructions for the programmable processor and are stored in a "computer-readable recording medium".

The computer-readable recording medium includes any type of recording devices in which data that can be read by a computer system is stored. The computer-readable recording medium may be a non-volatile or non-transitory medium, such as a ROM, a CD-ROM, a magnetic tape, a floppy disk, a memory card, a hard disk, a magneto-optical disc, and a storage device. The computer-readable recording medium may further include a transitory medium such as a data transmission medium. Further, the computer-readable recording medium may be distributed in network-connected computer systems, and computer-readable code may be stored and executed in a distributed manner.

Although operations are illustrated in the flowcharts/timing charts in this specification as being sequentially performed, this is merely a description of the technical idea of one embodiment of the present disclosure. In other words, those having ordinary skill in the art to which the present disclosure belongs may appreciate that various modifications and changes can be made without departing from essential features of the present disclosure. In other words, the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those having ordinary skill in the art should appreciate that various modifications, additions, and substitutions are possible, without departing from the technical idea and scope of the present disclosure. Therefore, embodiments of the present disclosure have been described for the sake of brevity and clarity. The scope of the technical idea of the present embodiments is not limited by the illustrations. Accordingly, one of ordinary skill should understand that the scope of the present disclosure is not to be limited by the above explicitly described embodiments but by the claims and equivalents of the claims.

What is claimed is:

1. An edge device for implementing decentralized edge computing using a plurality of neural networks having a stacked architecture, the edge device comprising:
    a setting unit configured to store trained parameters of a plurality of message generating neural networks (MGNNs) and a plurality of decentralized optimizing neural networks (DONNs) and to collect an input data;
    an uncooperative unit configured to generate an initial decision using a zero-th DONN of a zero-th layer that is a lowest layer of the stacked architecture;
    an adjacently cooperative unit configured to generate a first transmission messages using a first MGNN of a first layer that is upper layer of the zero-th layer, transmit the first transmission message to a neighbor edge device using a backhaul link, receive a first reception message generated in the neighbor edge device, and generate a first decision using a first DONN of the first layer based on the first reception message;
    a network-wide cooperative unit configured to generate a second transmission message using a second MGNN of a second layer that is upper layer of the first layer, transmit the second transmission message to the neighbor edge device using the backhaul link, receive a second reception message generated in the neighbor edge device, and generate a second decision using a second DONN of the second layer based on the second reception message; and
    a solution decision unit configured to determine the second decision as a final solution.

2. The edge device of claim 1, wherein the setting unit is further configured to decide a maximum multi-hop cooperation number T, initialize a current cooperation number t to 0, and increase the current cooperation number t by 1 in response to a generation of each decision;
    wherein the uncooperative unit generates the initial decision when the current cooperation number t is equal to 0;
    wherein the adjacently cooperative unit generates the first decision when the current cooperation number t is equal to 1; and
    wherein the network-wide cooperative unit sequentially generates the second to T-th decisions while the current cooperation number t is increased from 2 to T.

3. The edge device of claim 2, wherein the solution decision unit is further configured to:
    determine whether the current cooperation number t is equal to maximum multi-hop cooperation number T; and
    update the T-th decision to the final solution when the t value is equal to the maximum multi-hop cooperation number T.

4. The edge device of claim 2, wherein the network-wide cooperative unit is configured to:
    generate a t-th transmission message using a t-th MGNN of a t-th layer corresponding to the current cooperation number t; and
    generate a t-th decision using a t-th DONN of the t-th layer corresponding to the current cooperation number t.

5. The edge device of claim 4, wherein the second MGNN and the second DONN are reused as the t-th MGNN and t-th DONN, respectively, when the current cooperation number t is greater than 2.

6. The edge device of claim 4, wherein the first transmission message is configured to encapsulate the zero-th layer's statistics including the input data and the initial decision; and
    wherein the t-th transmission message is configured to encapsulate a (t−1)-th layer's statistics including a (t−1)-th reception message received from the neighbor edge device and a (t−1)-th decision.

7. The edge device of claim 4, wherein the initial decision is generated based on the input data collected by the edge device;
    wherein the first decision is generated based on the input data collected by each of the edge device and the neighbor edge device; and
    wherein the t-th decision is generated based on the input data collected by each of the edge device, the neighbor edge device, and a distant edge device that have no direct link with the edge device.

8. The edge device of claim 1, wherein the uncooperative unit configured to obtain the initial decision by inputting the input data into the zero-th DONN;
    wherein the adjacently cooperative unit configured to obtain the first decision by inputting the input data and the first reception message into the first DONN that is different from the zero-th DONN; and wherein the network-wide cooperative unit configured obtain the second decision by inputting the input data and the second reception message into the second DONN that is different from both the zero-th DONN and the first DONN.

9. The edge device of claim 1, wherein the adjacently cooperative unit configured to obtain the first transmission message by inputting the input data and the initial decision into the first MGNN; and wherein the network-wide cooperative unit configured obtain the second transmission message by inputting the input data, the first decision, and the first reception message into the second MGNN that is different from the first MGNN.

10. A method, performed by an edge device, for implementing decentralized edge computing using a plurality of neural networks having a stacked architecture, the method comprising:

storing trained parameters of a plurality of message generating neural networks (MGNNs) and a plurality of decentralized optimizing neural networks (DONNs);

collecting input data;

generating an initial decision using a zero-th DONN of a zero-th layer that is a lowest layer of the stacked architecture;

generating a first transmission message using a first MGNN of a first layer that is upper layer of the zero-th layer;

transmitting the first transmission message to a neighbor edge device and receiving a first reception message from the neighbor edge device using a backhaul link;

generating a first decision using a first DONN of the first layer based on the first reception message;

generating a second transmission message using a second MGNN of a second layer that is upper layer of the first layer;

transmitting the second transmission message to the neighbor edge device receiving a second reception message from the neighbor edge device using the backhaul link;

generating a second decision using a second DONN of the second layer based on the second reception message; and deciding a second decision as a final solution.

11. The method of claim 10, further comprising:
deciding a maximum multi-hop cooperation number T;
initializing a current cooperation number t to 0; and
increasing the current cooperation number t by 1 in response to a generation of each decision,
wherein the initial decision is generated when the current cooperation number t is equal to 0;
wherein the first decision is generated when the current cooperation number t is equal to 1; and
wherein the generating of the second transmission message, the transmitting of the second transmission message, the receiving of the second reception message, and the generating of the second decision are performed repeatedly from the time when the current cooperation number is equal to 2 to the time when the current cooperation number t is equal to the maximum multi-hop cooperation number T.

12. The method of claim 11, wherein the deciding includes:
determining whether the current cooperation number t is equal to maximum multi-hop cooperation number T; and
updating a T-th decision to the final solution when the t value is equal to the maximum multi-hop cooperation number T.

13. The method of claim 11, wherein the performing repeatedly includes:
generating a t-th transmission message using a t-th MGNN of a t-th layer corresponding to the current cooperation number t; and
generating a t-th decision using a t-th DONN of the t-th layer corresponding to the current cooperation number t.

14. The method of claim 13, wherein the second MGNN and the second DONN are reused as the t-th MGNN and t-th DONN, respectively, when the current cooperation number t is greater than 2.

15. The method of claim 13, wherein the first transmission message is configured to encapsulate the zero-th layer's statistics including the input data and the initial decision; and
wherein the t-th transmission message is configured to encapsulate a (t−1)-th layer's statistics including a (t−1)-th reception message received from the neighbor edge device and a (t−1)-th decision.

16. The method of claim 13, wherein the initial decision is generated based on the input data collected by the edge device;
wherein the first decision is generated based on the input data collected by each of the edge device and the neighbor edge device; and
wherein the t-th decision is generated based on the input data collected by each of the edge device, the neighbor edge device, and a distant edge device that have no direct link with the edge device.

17. The method of claim 13, wherein the generating of the initial decision includes inputting the input data into the zero-th DONN;
wherein the generating of the first decision includes inputting the input data and the first reception message into the first DONN that is different from the zero-th DONN; and
wherein the generating of the second decision includes inputting the input data and the second reception message into the second DONN that is different from both the zero-th DONN and the first DONN.

18. The method of claim 10, wherein the generating of the first transmission message includes inputting the input data and the initial decision into the first MGNN; and
wherein the generating of the second transmission message includes inputting the input data, the first decision, and the first reception message into the second MGNN that is different from the first MGNN.

19. A computer program stored on a non-transitory computer-readable recording medium to perform each step included in the method of claim 10.

* * * * *